May 6, 1930.  C. P. WEST  1,757,606
MOTOR STARTING SYSTEM
Filed Dec. 9, 1927
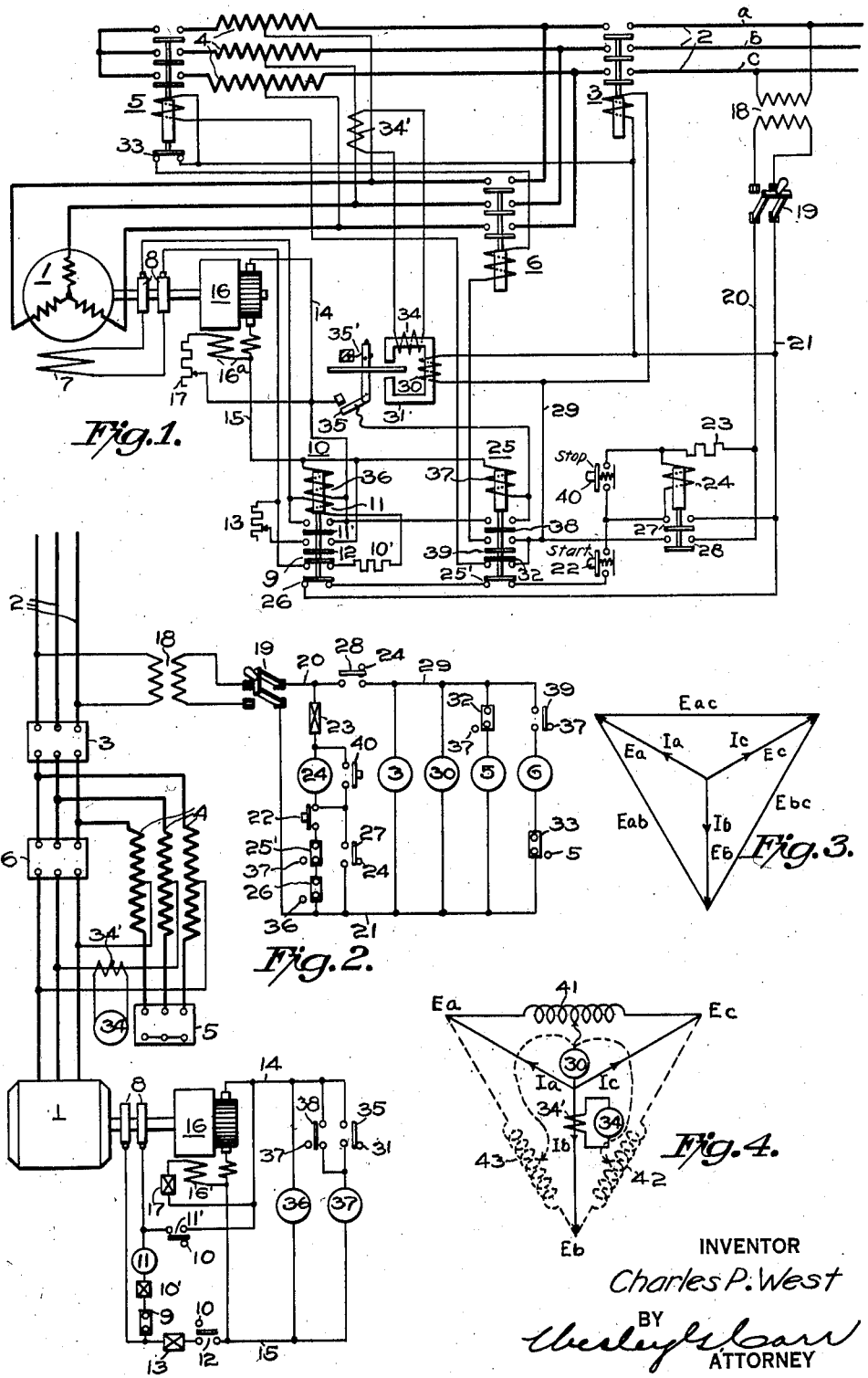
INVENTOR
Charles P. West
BY
ATTORNEY Patented May 6, 1930

1,757,606

UNITED STATES PATENT OFFICE

CHARLES P. WEST, OF PITTSBURGH, PENNSYLVANIA, ASSIGNOR TO WESTINGHOUSE ELECTRIC & MANUFACTURING COMPANY, A CORPORATION OF PENNSYLVANIA

MOTOR-STARTING SYSTEM

Application filed December 9, 1927. Serial No. 238,811.

This invention pertains to a system for automatically starting alternating-current motors and is especially adapted for use in starting motor-generator sets in automatically or semi-automatically operated substations.

This system is especially designed for the starting of synchronous motors although it may be easily adapted for use with induction motors.

One object of my invention is to provide a motor-starting system in which the motor is started on a reduced voltage and is transferred to normal running voltage when it has reached substantially synchronous speed.

Another object of my invention is to control the transfer of the motor from starting to running connections by means of the change in the power factor of the motor-starting current when the motor reaches synchronous speed.

Another object of my invention is to limit the motor-field current while the motor is below synchronous speed and to increase it to its normal value when the motor has attained synchronous speed.

A further object of my invention is to provide means for starting a synchronous motor with its field shunted through a resistor, and to prevent transfer from starting to running connections until the magnitude and frequency of the current induced in the field during starting period are below predetermined values.

It is well known that, as a synchronous motor approaches synchronous speed, its power factor changes from lagging to leading. At starting, the power factor is lagging, but when the motor reaches synchronous speed, the power factor becomes unity, and, by proper adjustment of the value of the field current, the power factor of the motor-starting currrent may be made leading. It is also known that, during the starting period, a voltage is induced in the field windings of a synchronous motor and, if the field circuit is closed, a current of decreasing frequency will circulate through the field windings until the motor reaches synchronous speed. I utilize these facts to control the proper starting of a synchronous motor.

For a complete understanding of my invention, reference should be had to the accompanying drawing, in which—

Figure 1 is a diagram of the complete circuit of the system embodying my invention;

Fig. 2 is a schematic diagram of the same circuit which is shown in full in Figure 1;

Fig. 3 is a vector diagram showing the relation of current and voltage; and

Fig. 4 is a vector diagram indicating connections which may be employed in a modification of my starting system.

In Figure 1, is illustrated a synchronous motor 1 which may be supplied with electrical energy from a source 2 through a main circuit breaker 3. Autotransformers 4 and a starting switch 5 are provided for starting the motor on reduced voltage, and a running switch 6 is utilized to connect the motor directly to the source 2 after it has reached synchronous speed.

The field winding 7 of the motor is connected, through slip rings 8 and a contact 9 of a relay 10, to a field-discharge resistor 10' and a holding coil 11 of the relay 10. The contact 9 is closed when the relay 10 is deenergized, or when the coil 11 only is energized, since the coil 11, when energized, tends to maintain the contacts of the relay 10 in their lowermost position. The field winding 7 is adapted to be connected by the closing of contacts 11' and 12, which are closed when the relay 10 moves to its upper position, to the busses 14 and 15, through a rheostat 13. The busses 14 and 15 are energized with direct-current voltage by an exciter 16 directly connected to the shaft of the motor 1. The field windings of the exciter 16 are indicated at 16ª. A rheostat 17 controls the exciter field current.

Energy for the operation of the control devices to be described hereinafter, is taken from the source 2 by means of a transformer 18. A switch 19 is provided to connect the secondary of the transformer 18 to alternating-current control busses 20 and 21. The remaining control elements of the starting system of my invention will be described and their functions stated during the progress of the description of operation which will now be given.

The starting of motor 1, according to my invention, is controlled by a switch 22 which is illustrated as a pushbutton switch, although it is to be understood that any automatically operated or remotely controlled switch may be substituted for that shown. The closing of the switch 22 establishes a circuit from the alternating-current control bus 20 through a resistor 23, the operating coil of a relay 24, the switch 22, contact 25' which is closed when a relay 25 is deenergized, contact 26 of relay 10 which is closed when relay 10 is deenergized, and thence back to the other control bus 21. The establishment of this circuit energizes the relay 24 which operates to close its contacts 27 and 28. The closing of the contact 27 completes a locking circuit for the relay 24 which shunts starting switch 22 and the contacts 25' and 26. The closing of the contact 28 energizes an auxiliary alternating-current control bus 29.

The energization of the auxiliary control bus 29 causes current to be supplied to the operating coil of the main circuit breaker 3 which is closed to connect the auto-transformers 4 to the source 2. Simultaneously, the operating coil of the starting switch 5 is energized through a circuit from the control bus 29 through a contact 32 on the relay 25, which is closed when the relay is deenergized, through the coil of starting contactor 5, and thence to the control bus 21.

A relay 31, which is illustrated as of the induction type, has a potential coil 30 and a current coil 34. The potential coil is energized from the bus 29 as soon as the contact 28 is closed. The current coil 34 is energized by the output of a current transformer 34' connected to one of the motor-starting leads. The relay 31 is provided with contacts 35, the function of which will be explained hereinafter, which are biased to the open position by a spring 35'.

When, as above described, the main circuit breaker 3 and the starting contactor 5 are closed, a reduced voltage is applied to the armature windings of the motor 1 which starts in the well known manner. As was stated before, the field circuit of the motor is closed during the starting period and includes the coil 11 which tends, when energized, to maintain the contacts of the relay 10 in the lower position. Opposing the effect of the coil 11 is a coil 36 which is connected across the busses 14 and 15 of the exciter 16. At the beginning of the starting period, the voltage generated by the exciter 16 is comparatively low, whereas the alternating current induced in the field winding of the motor is comparatively high because of the relative speed of the rotating field set up by the armature windings and the slowly rotating motor field. Under these conditions, the contacts of relay 10 will be maintained in their lower position.

As the motor comes up to speed, however, the alternating current circulating through the coil 11 of the relay 10 will be decreased both in magnitude and frequency, whereas the current in the coil 36 will be increased due to the increasing voltage across the busses 14 and 15. When the values of the currents in the coils 11 and 36 have attained predetermined values, the relay is so actuated that its contacts move to their upper position. This operation of the relay 10 disconnects the motor field winding 7 from the resistor 10' and the winding 11, by the opening of contact 9. The closing of the contacts 11' and 12, however, connects the motor field to the exciter busses 14 and 15 through a rheostat 13. Contact 26 is also opened by the operation of the relay 10, but does not affect its circuit since contact 26 is shunted by the contact 27 of relay 24.

As shown in Figure 1, the potential coil 30 of the relay 31 is connected across the phases $a$ and $c$ of the source 2, while the current coil 34 is energized by the current passing through phase $b$. The relay is designed to develop maximum torque when the currents traversing the two windings are in phase. Reference to Fig. 3 will disclose that, when the power factor of the starting current supplied to the motor is unity, there will be no torque tending to rotate the contact of the relay 31. This is obvious from the fact that, at unity power factor, as illustrated in Fig. 3, the current $I_b$ is at right angles to the voltage $E_{ac}$. The relay 31 is so designed that, at leading power factor, its rotating element will tend to close the contacts 35. At lagging power factor, of course, the rotation is in reverse direction to maintain the contacts open.

When the motor has reached substantially synchronous speed and the field thereof has been connected to the exciter 16, the power factor of the current supplied to the motor is changed from lagging to leading, as has been previously explained. This causes the relay 31 to operate in such manner as to close the contacts 35.

The closing of the contacts 35 completes a circuit from the direct-current control bus 14 through the contact 35, the operating coil 37 of relay 25, and thence to the other control bus 15. The completion of this circuit energizes the coil 37 of the relay 25 which then operates to close the contacts 38 and 39 and to open the contacts 32 and 25'. The closing of the contact 38 completes a locking circuit for the relay 25 by shunting the contact 35. The opening of the contact 32 interrupts the circuit including the operating coil of the starting switch 5 which is thereupon opened. Contact 35 of the relay 31 is returned to its open position by the spring 35' when the starting switch 5 is opened and the current coil 34 de-energized.

The opening of the contact 25', which is shunted by the contact 27, has no effect on its circuit. Closing of the contact 39, however, connects the operating coil of the running switch 6 to the auxiliary bus 29 and, through an interlock 33 on the starting switch 5, which is closed when the starting switch is open, to the control bus 21. This results in the energization of the coil of the running contactor 6 which is then closed to connect the motor 1 directly to the source 2. The motor 1 is now running at synchronous speed and is supplied with normal operating voltage, and is, therefore, prepared to carry its load.

When it is desired to stop the motor 1, it is only necessary to close the switch 40 which short circuits the operating coil of the relay 24. This operation results in the deenergization of the relay 24 and the opening of its contacts 27 and 28. The opening of the contact 28 disconnects the auxiliary bus 29 from the bus 20 and deenergizes the closing coil of the main circuit breaker 3 and the coil of the running contactor 6. The motor 1 is thereupon disconnected from its source of supply and slowly decelerates. As the voltage across the busses 14 and 15 decreases to a predetermined value, the relays 10 and 25 are deenergized and return to their original positions. The entire system is thereupon deenergized and ready for a repetition of the above described starting cycle.

Fig. 2 is merely a schematic diagram of the circuits shown in full in Figure 1, the various relays and the contacts closed thereby being shown in the conventional manner. The operation above described in connection with Figure 1 may also be read in connection with Figure 2 since it is identical, and, therefore, will not be repeated.

Fig. 3 has been described in connection with the description of the operation of the relay 31 which controls the transfer of the motor armature from the starting to running connections when the power factor of the starting current changes from lagging to leading as the motor reaches synchronous speed.

Fig. 4 shows how the potential coil 30 of the relay 31 may be connected to various points on phase splitters 41, 42 or 43 to obtain any desired component of any phase voltage, which, in cooperation with the starting current in one phase, in accordance with which the current coil 34 is energized by the current transformer 34', may be utilized to obtain operation of the relay 31 at any desired relation between the current and voltage.

By suitable adjustment of the phase-splitters and connection of the voltage coil thereto, a simulated condition of synchronism in advance of actual synchronous conditions may be established to cause the operation of the relay 31 prior to the actual attainment of synchronism. Similarly, if desired, for any reason, the operation may be delayed until a definite excitation is established after synchronism.

The power factor of the starting current of an induction motor changes as it accelerates to its normal speed, and, therefore, my starting system may be utilized to control the transfer from starting to running connections of such a motor. The circuits by which an induction motor might be started by my system are thought to be obvious from the present description to those skilled in the art which my invention concerns, and, for that reason, are not described in detail.

Although I have described specifically only a single modification of my invention, it is my intention that further modifications which are within the scope of the appended claims shall be considered as a part thereof.

I claim as my invention:

1. In a starting system for an alternating-current motor, a source of current therefore having low-voltage and full-voltage taps, and means responsive to the power factor of the motor-starting current for automatically controlling the transfer of the motor armature from the low-voltage taps to the full-voltage taps when the motor reaches synchronous speed.

2. In a starting system for a synchronous motor, a source of current therefor having low-voltage and full-voltage taps, means for connecting the motor armature to the low-voltage taps, and automatic means responsive to the power factor of the armature current for transferring the armature to the full-voltage taps when the motor reaches synchronous speed.

3. In a starting system for a synchronous motor, a source of current therefor having low-voltage and full-voltage taps, means for connecting the motor armature to said low-voltage taps and automatic means responsive to leading power factor of the armature current for transferring the armature to the full-voltage taps when the motor has reached synchronous speed.

4. A starting system for a synchronous motor comprising a source of current therefor having low-voltage and full-voltage taps, an exciter generator driven by said motor for energizing the motor-field winding, means for shunting the field winding through a resistor when the exciter voltage is below a predetermined value, means for removing said shunt and connecting the field winding to the exciter when the exciter voltage is above said predetermined value, means for connecting the motor armature to said low-voltage taps for starting the motor, and automatic means responsive to leading power factor of the starting current for transferring the armature to said full-voltage taps when the motor reaches synchronous speed.

5. In a motor-starting system having low-voltage starting and full-voltage running sources, starting and running contactors for connecting the motor thereto, means for closing the starting contactor and means responsive to the power factor of the starting current for opening the starting contactor and closing the running contactor when the motor attains substantially synchronous speed.

6. The combination, in a motor-starting system, of low-voltage starting and full-voltage running sources, starting and running contactors for connecting the motor thereto, means for closing the starting contactor, and a contact-making wattmeter for opening the starting contactor and closing the running contactor when the power factor of the starting current changes as the motor comes up to substantially synchronous speed.

7. A motor-starting system comprising low-voltage and full-voltage electrical sources for starting and running a motor, starting and running contactors for connecting the motor to said sources, a field contactor which, when open, shunts the field winding of the motor through a resistor and, when closed, connects the field to a generator driven by the motor, means for closing the starting contactor and means for closing the field contactor when the generator voltage reaches a predetermined value, and a relay responsive to the change in the power factor of the starting current, as the motor comes up substantially to synchronous speed, for causing the starting contactor to open and the running contactor to close.

8. The method of starting a motor provided with an exciter which consists in impressing a low starting voltage across the motor armature, impressing the exciter voltage across the field winding when the induced field current has decreased to a predetermined value, and finally impressing full running voltage across the motor when it has reached substantially synchronous speed and the power factor of the starting current has reached a predetermined value.

9. The method of starting a synchronous motor provided with an exciter which consists in connecting a resistor in series-circuit relation with the field winding of the motor to limit the induced field current, impressing a low starting voltage across the motor to develop a starting torque, interrupting the field-winding resistor circuit and connecting the field winding across the exciter when the induced field current has decreased to a predetermined value and the motor has reached substantially synchronous speed, measuring the power factor of the starting current, and then impressing a high running voltage across the motor when the motor has reached synchronous speed and the power factor of the starting current has reached a predetermined value.

10. In a motor starting system, in combination, a motor, a source of power for the motor having a low-voltage starting tap and a high-voltage running tap, a starting switch, means for effecting the operation of the starting switch to start the motor, and means including a relay responsive to the power factor of the starting current for effecting opening and closing operation of the starting and running switches, respectively.

11. In a motor-starting system, in combination, a motor, low-voltage starting and high-voltage running sources of power for the motor, means operable to effect successively a connection of the motor to said power sources, means for initiating the operation of said connecting means, and means responsive to the starting current when it reaches a predetermined power factor for completing the operation of said connecting means, whereby the motor is automatically transferred from starting to running voltage when near synchronous speed.

In testimony whereof, I have hereunto subscribed my name this 5th day of December, 1927.

CHARLES P. WEST.